(12) United States Patent
Gerraty

(10) Patent No.: US 11,157,609 B1
(45) Date of Patent: Oct. 26, 2021

(54) APPARATUS, SYSTEM, AND METHOD FOR SECURE EXECUTION OF UNSIGNED SCRIPTS

(71) Applicant: Juniper Networks, Inc., Sunnyvale, CA (US)

(72) Inventor: Simon J. Gerraty, Sunnyvale, CA (US)

(73) Assignee: Juniper Networks, Inc, Sunnyvale, CA (US)

( * ) Notice: Subject to any disclaimer, the term of this patent is extended or adjusted under 35 U.S.C. 154(b) by 309 days.

(21) Appl. No.: 16/408,376

(22) Filed: May 9, 2019

(51) Int. Cl.
  *G06F 21/44* (2013.01)
  *G06F 21/51* (2013.01)

(52) U.S. Cl.
  CPC ............. *G06F 21/44* (2013.01); *G06F 21/51* (2013.01); *G06F 2221/034* (2013.01)

(58) Field of Classification Search
  CPC ..... G06F 21/44; G06F 21/51; G06F 2221/034
  See application file for complete search history.

(56) References Cited

U.S. PATENT DOCUMENTS

| | | | | |
|---|---|---|---|---|
| 8,615,545 | B1 * | 12/2013 | Lakhdhir | G06F 9/451 709/203 |
| 10,798,077 | B1 * | 10/2020 | Pratt | G06F 21/44 |
| 2008/0127297 | A1 * | 5/2008 | Morris | H04L 63/164 726/1 |
| 2013/0332981 | A1 * | 12/2013 | Paris | H04L 63/20 726/1 |
| 2014/0189683 | A1 * | 7/2014 | Bing | G06F 9/45533 718/1 |
| 2015/0128209 | A1 * | 5/2015 | Clevy | G06F 21/54 726/1 |
| 2019/0089545 | A1 * | 3/2019 | Dias Correa | G06F 21/53 |

OTHER PUBLICATIONS

Default Policy Implementation and Policy File Syntax. [Documentation, Online]; Oracle Corporation, 2011 [retrieved on May 6, 2021]; Retrieved from the Internet; URL: https://docs.oracle.com/javase/7/docs/technotes/guides/security/PolicyFiles.html (Year: 2011).*

(Continued)

*Primary Examiner* — Peter C Shaw
*Assistant Examiner* — Zhe Liu
(74) *Attorney, Agent, or Firm* — FisherBroyles, LLP

(57) ABSTRACT

A disclosed method may include (1) identifying a child process that spawned from a parent process running on a computing device, (2) receiving, from the child process, a request to execute an unsigned script on the computing device, (3) determining, in response to the request, whether to override a restriction against executing unsigned scripts by (A) checking an access-control label referenced by the parent process and (B) determining that the access-control label indicates that the parent process has a privilege to override the restriction, (4) imputing, to the child process, the privilege of the parent process to override the, and then (5) executing, on the computing device, the unsigned script despite the restriction due at least in part to the privilege of the parent process having been imputed to the child process. Various other apparatuses, systems, and methods are also disclosed.

14 Claims, 7 Drawing Sheets

(56) References Cited

OTHER PUBLICATIONS

TCG Guidance for Securing Network Equipment Using TCG Technology. [Documentation, Online]; Trusted Computing Group, 2018 [retrieved on May 7, 2021]; Retrieved from the Internet; URL: https://trustedcomputinggroup.org/wp-content/uploads/TCG_Guidance_for_Securing_NetEq_1_0r29.pdf (Year: 2018).*

Default Policy Implementation and Policy File Syntax. p. 4 (Documentation, Online). Oracle Corporation, 2011 (retrieved on May 6, 2021). Retrieved from the Internet. URL: https://docs.oracle.com/javase/7/docs/technotes/guides/security/PolicyFiles.html (Year: 2011).*

Li, Jian. Proxy compilation for Java via a code migration technique. p. 4, and 13-15. (Doctoral dissertation, University of Sussex, Online), 2010 (retrieved on Aug. 11, 2021). Retrieved from the Internet. URL: https://core.ac.uk/download/pdf/2709901.pdf (Year: 2010).*

\* cited by examiner

US 11,157,609 B1

APPARATUS, SYSTEM, AND METHOD FOR SECURE EXECUTION OF UNSIGNED SCRIPTS

BACKGROUND

Data centers often implement computing devices that arrive in an unprovisioned state. In other words, these computing devices may arrive at the data centers without being programmed with the corresponding keys and/or settings that facilitate proper operation. To automate the programming of such keys and/or settings, these computing devices may initiate Zero Touch Provisioning (ZTP) immediately upon power-up at the data centers.

Unfortunately, some traditional computing devices may be unable to run certain legitimate scripts during ZTP. For example, a conventional computing device may support the execution of only signed scripts. In other words, this conventional computing device may refuse to execute unsigned scripts. However, because it arrives unprovisioned, this conventional computing device may be unable to sign any scripts for execution prior to the completion of ZTP. As a result, the computing device may be unable to execute any unsigned scripts during ZTP. The instant disclosure, therefore, identifies and addresses a need for additional and improved apparatuses, systems, and methods for secure execution of unsigned scripts.

SUMMARY

As will be described in greater detail below, the instant disclosure generally relates to apparatuses, systems, and methods for secure execution of unsigned scripts. In one example, a method for accomplishing such a task may include (1) identifying a child process that spawned from a parent process running on a computing device, (2) receiving, from the child process, a request to execute an unsigned script on the computing device, (3) determining, in response to the request, whether to override a restriction against executing unsigned scripts by (A) checking an access-control label referenced by the parent process and (B) determining that the access-control label referenced by the parent process indicates that the parent process has a privilege to override the restriction against executing unsigned scripts, (4) imputing, to the child process, the privilege of the parent process to override the restriction against executing unsigned scripts, and then (5) executing, on the computing device, the unsigned script despite the restriction due at least in part to the privilege of the parent process having been imputed to the child process.

Similarly, a system that implements the above-identified method may include a physical processing device configured to execute various modules stored in memory. In one example, this system may include and/or execute a verification module that (1) identifies a child process that spawned from a parent process running on a computing device and (2) receives, from the child process, a request to execute an unsigned script on the computing device. In this example, the system may also include a privilege module that (1) determines, in response to the request, whether to override a restriction against executing unsigned scripts by (A) checking an access-control label referenced by the parent process and (B) determining that the access-control label referenced by the parent process indicates that the parent process has a privilege to override the restriction against executing unsigned scripts and (2) imputes, to the child process, the privilege of the parent process to override the restriction against executing unsigned scripts. In addition, the system may include an execution module that executes the unsigned script on the computing device despite the restriction due at least in part to the privilege of the parent process having been imputed to the child process.

Additionally or alternatively, an apparatus that implements the above-identified method may include that stores an underlying program capable of running on a computing device. In one example, the apparatus may also include a physical processing device that is communicatively coupled to the storage device. In this example, the physical processing device may (1) identify a child process that spawned from a parent process running on a computing device, (2) receive, from the child process, a request to execute an unsigned script on the computing device, (3) determine, in response to the request, whether to override a restriction against executing unsigned scripts by (A) checking an access-control label referenced by the parent process and (B) determining that the access-control label referenced by the parent process indicates that the parent process has a privilege to override the restriction against executing unsigned scripts, (4) impute, to the child process, the privilege of the parent process to override the restriction against executing unsigned scripts, and then (5) execute, on the computing device, the unsigned script despite the restriction due at least in part to the privilege of the parent process having been imputed to the child process.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
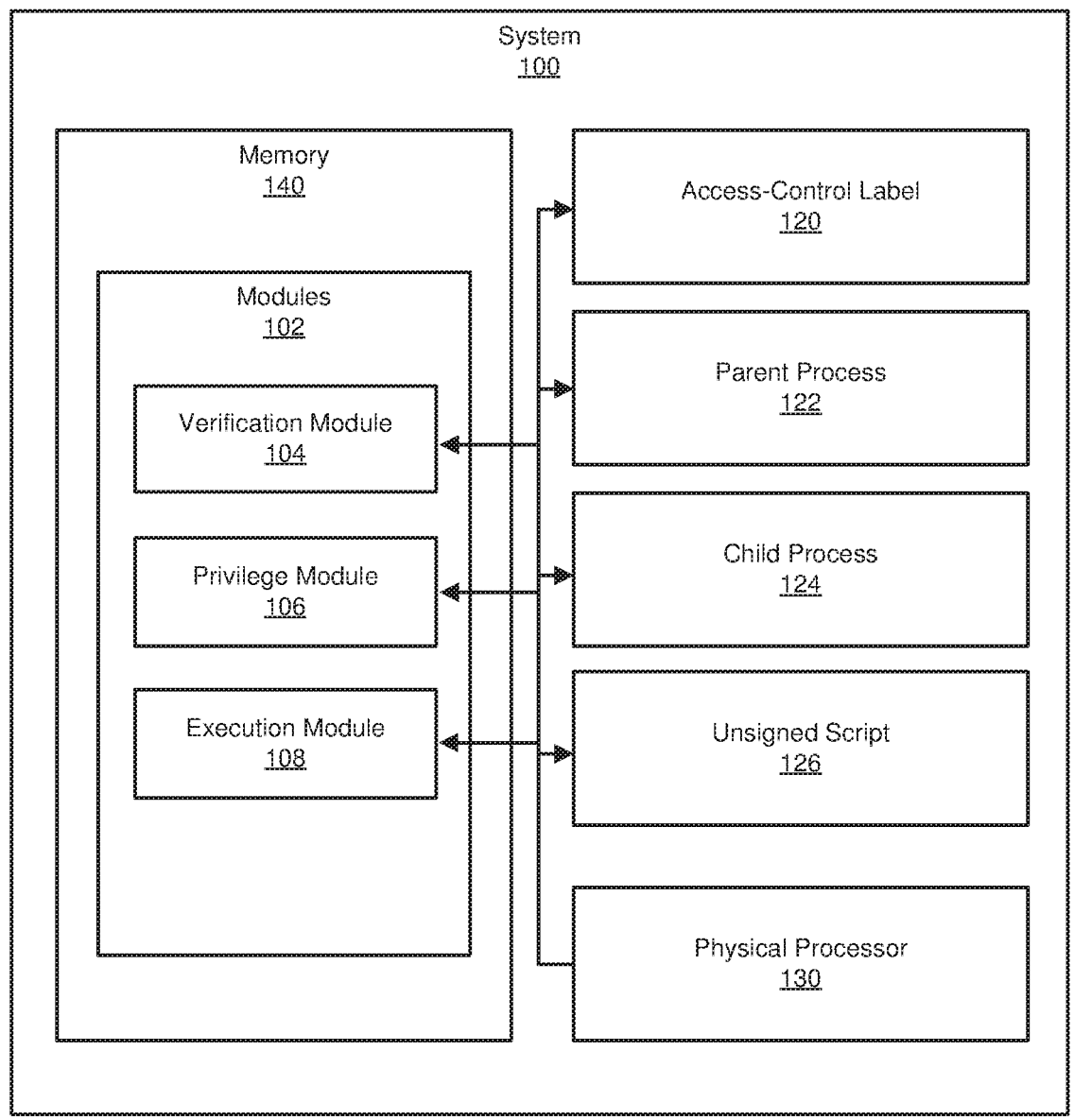
FIG. 1 is a block diagram of an exemplary system for secure execution of unsigned scripts.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for secure execution of unsigned scripts. As will be explained in greater detail below, embodiments of the instant disclosure may enable computing devices to execute legitimate unsigned scripts during ZTP without compromising security. By enabling computing devices to execute legitimate unsigned scripts during ZTP in this way, these embodiments may improve the efficiency and/or productivity of such computing devices prior to being fully provisioned via ZTP. In addition, these embodiments may be able to ensure that such execution of unsigned scripts is limited to the period of time in which ZTP is performed on the computing devices. In other words, upon completion of ZTP and/or bootup, these embodiments may prevent subsequent attempts to execute unsigned scripts in the future. By doing so, these embodiments may enable the computing devices to successfully and/or simultaneously (1) improve efficiency and/or productivity and (2) maintain a high level of security.

Figure 2:
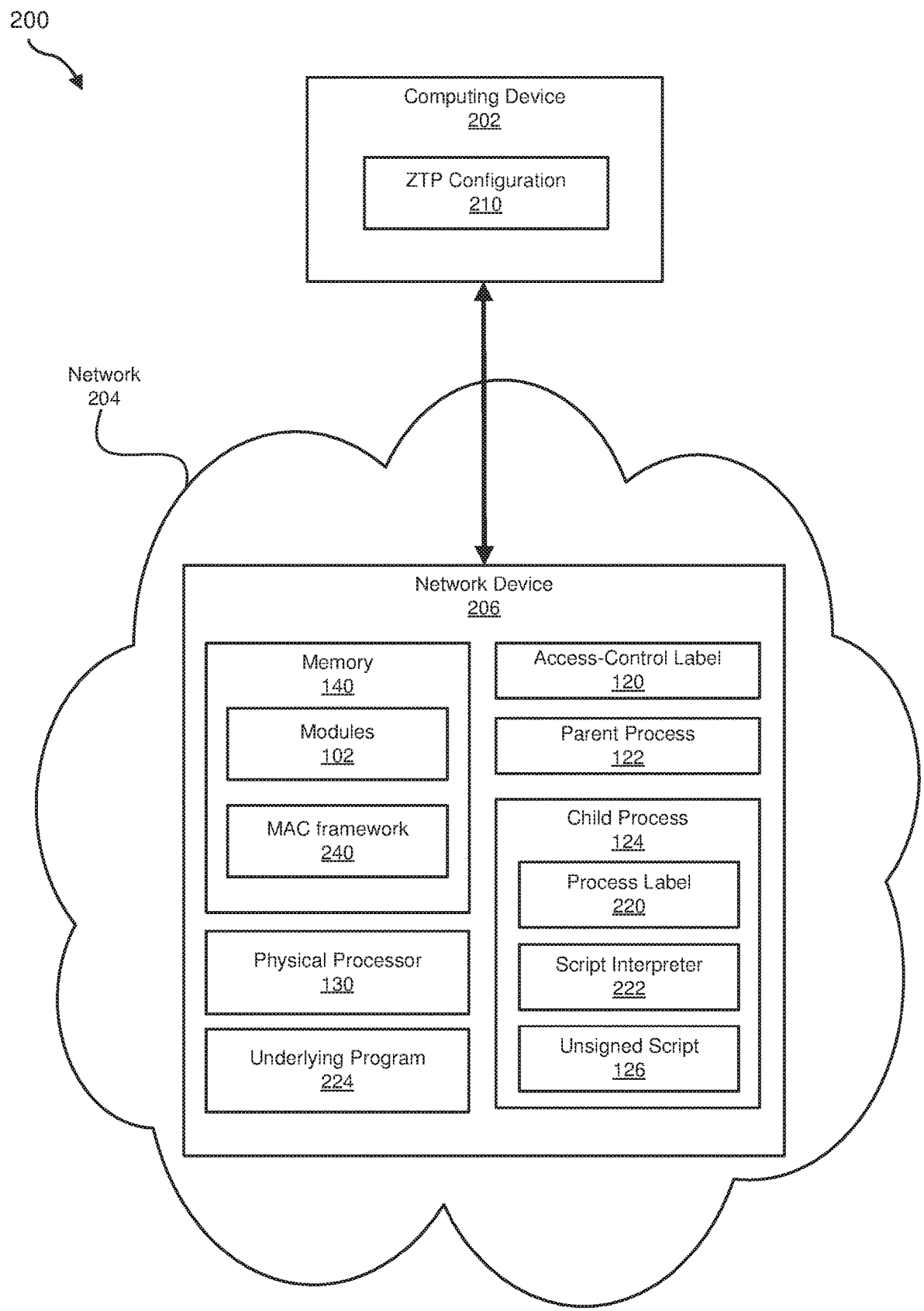
FIG. 2 is a block diagram of an exemplary system for secure execution of unsigned scripts.

The following will provide, with reference to FIGS. 1 and 2, detailed descriptions of exemplary apparatuses, systems, and corresponding implementations for secure execution of unsigned scripts. Detailed descriptions of corresponding computer-implemented methods and flow diagrams will be provided in connection with FIGS. 3, 5, and 6. Detailed descriptions of an exemplary portion of a script interpreter will be provided in connection with FIG. 4. In addition, detailed descriptions of an exemplary computing system for carrying out these methods will be provided in connection with FIG. 7.

FIG. 1 shows an exemplary system 100 that facilitates secure execution of unsigned scripts. As illustrated in FIG. 1, system 100 may include one or more modules 102 for performing one or more tasks. As will be explained in greater detail below, modules 102 may include a verification module 104, a privilege module 106, and/or an execution module 108. Although illustrated as separate elements, one or more of modules 102 in FIG. 1 may represent portions of a single module or application (such as an operating system, an access-control framework, a processing application, and/or a network application) running on a processing device, a routing engine, a field-replaceable unit, a packet forwarding engine, and/or any other suitable component of a computing device.

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or network device 206). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate the secure execution of unsigned scripts. Examples of physical processor 130 include, without limitation, CPUs, microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include and/or involve one or more labels, such as access-control label 120. In some examples, access-control label 120 may include and/or represent a Mandatory Access Control (MAC) label. Additionally or alternatively, access-control label 120 may include and/or represent all or a portion of a file and/or data structure that stores and/or identifies certain privileges of processes, programs, executables, and/or scripts on a computing device. In one example, access-control label 120 may include and/or represent text and/or metadata associated with one or more processes, programs, executables, and/or scripts stored on the computing device. For example, access-control label 120 may include and/or represent text and/or metadata associated with a parent process 122 in FIG. 1 along with one or more additional processes. Accordingly, access-control label 120 may apply to, correspond to, and/or be shared by multiple processes (including, e.g., parent process 122).

As illustrated in FIG. 1, exemplary system 100 may additionally include and/or involve one or more processes, such as parent process 122 and/or child process 124. In some examples, parent process 122 may include and/or represent an execution instance of an underlying program (such as underlying program 224 in FIG. 2). In one example, child process 124 may include and/or represent a different execution instance of the same underlying program. In this example, parent process 122 may spawn child process 124. For example, parent process 122 may issue a "fork( )" system call that generates child process 124. In this example, child process 124 may include and/or represent a clone and/or identical copy of parent process 122.

In some examples, parent process 122 and/or child process 124 may include and/or represent a Dynamic Host Configuration Protocol (DHCP) client. In other examples, parent process 122 and/or child process 124 may include and/or represent a management daemon and/or an event daemon. In certain embodiments, parent process 122 and/or child process 124 may be included in and/or represent part of a ZTP process and/or bootup process programmed to run on a computing device immediately upon the first power-up.

As illustrated in FIG. 1, exemplary system 100 may additionally include and/or involve one or more scripts, such as unsigned script 126. In some examples, unsigned script 126 may include and/or represent unsigned code. In one example, such unsigned code may include and/or represent PYTHON code and/or RUBY code. In this example, the unsigned code may be configured and/or intend to perform one or more tasks, such as discovering certain details about the underlying hardware device, fetching configuration settings, etc.

In some examples, the term "unsigned" may refer to a script's lack of a digital signature. In these examples, the lack of such a digital signature may indicate that the authenticity and/or integrity of script 126 is unverified and/or unknown. Because, in these examples, script 126 is unsigned, child process 124 may initially be prevented from executing unsigned script 126 unless and/or until an access-control framework (such as MAC framework 240) determines that child process 124 has a special privilege to override the restriction against executing unsigned scripts.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication between a computing device 202 and/or a network device 206. In one example, network device 206 may include and/or incorporate memory 140 and physical processor 130. In this example, physical processor 130 may execute and/or implement one or more of modules 102 stored in memory 140 for the purpose of securely executing unsigned scripts.

For example, and as will be described in greater detail below, one or more of modules 102 may cause network device 206 to (1) identify child process 124 that spawned from parent process 122, (2) receive, from child process 124, a request to execute unsigned script 126 on network device 206, (3) determine, in response to the request, whether to override a restriction against executing unsigned scripts by (A) checking access-control label 120 referenced by parent process 122 and (B) determining that access-control label 120 referenced by parent process 122 indicates that parent process 122 has a privilege to override the restriction against executing unsigned scripts, (4) impute, to child process 124, the privilege of parent process 122 to override the restriction against executing unsigned scripts, and then (5) execute unsigned script 126 despite the restriction due at least in part to the privilege of parent process 122 having been imputed to child process 124.

Network device 206 generally represent any type or form of physical computing device capable of reading computer-executable instructions and/or handling network traffic. In one example, network device 206 may include and/or represent a router (such as a provider edge router, hub router, spoke router, autonomous system boundary router, and/or area border router) that receives, routes, forwards, and/or otherwise handles network traffic. Additional examples of network device 206 include, without limitation, switches, hubs, modems, bridges, repeaters, gateways, multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable network devices. An apparatus for secure execution of unsigned scripts may include and/or represent all or a portion of network device 206.

Network 204 generally represents any medium or architecture capable of facilitating communication or data transfer. In one example, network 204 may facilitate communication between network device 206 and computing device 202. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although illustrated as being external to network 204 in FIG. 2, computing device 202 may alternatively represent a portion of network 204 and/or be included in network 204.

Computing device 202 generally represents any type or form of computing device capable of reading computer-executable instructions. In one example, computing device 202 may include and/or represent a ZTP server that delivers a ZTP configuration 210 to network device 206. Additional examples of computing device 202 include, without limitation, network devices, endpoint devices, laptops, tablets, desktops, servers, cellular phones, PDAs, multimedia players, embedded systems, client devices, wearable devices (e.g., smart watches, smart glasses, etc.), gaming consoles, variations or combinations of one or more of the same, and/or any other suitable computing device.

Figure 3:
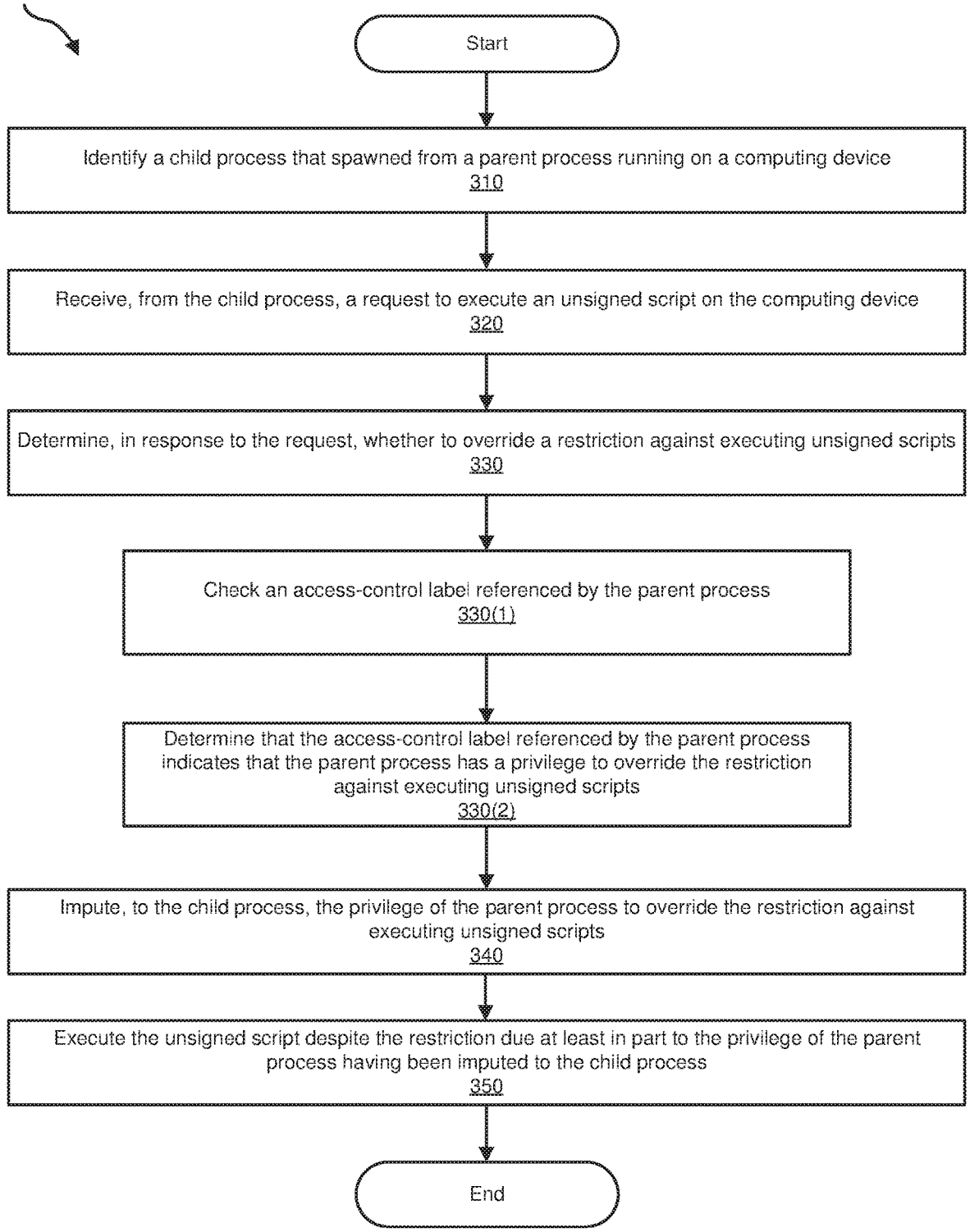
FIG. 3 is a flow diagram of an exemplary method for secure execution of unsigned scripts.
Figure 4:
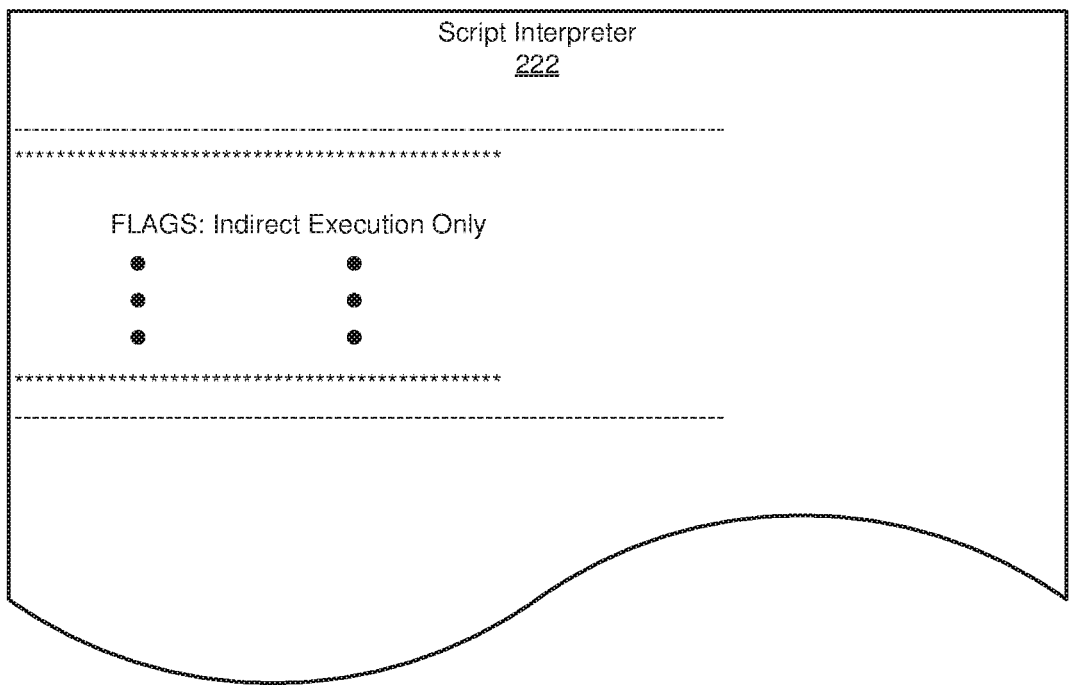
FIG. 4 is an illustration of an exemplary portion of a script interpreter.

FIG. 3 is a flow diagram of an exemplary computer-implemented method 300 for secure execution of unsigned scripts. The steps shown in FIG. 3 may be performed by any suitable computer-executable code and/or computing system, including system 100 in FIG. 1, system 200 in FIG. 2, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may identify a child process that spawned from a parent process running on a computing device. For example, verification module 104 may, as part of network device 206 in FIG. 2, identify child process 124 that spawned from parent process 122 running on network device 206. In this example, child process 124 may represent a clone and/or identical copy of parent process 122.

The systems described herein may perform step 310 in a variety of ways and/or contexts. In some examples, verification module 104 may identify child process 124 as its spawned from parent process 122. For example, execution module 108 may launch parent process 122 from an underlying program 224 in FIG. 2. In one example, underlying program 224 may include and/or represent the computer file from which parent process 122 is launched. Examples of underlying program 224 include, without limitation, DHCP clients, management daemons, event daemons, combinations or variations of one or more of the same, and/or any other suitable underlying program.

In some examples, privilege module 106 may associate access-control label 120 with underlying program 224. For example, privilege module 106 may configure access-control label 120 to indicate that underlying program 224 has the privilege to override a restriction against executing unsigned scripts and/or the privilege to override a flag for only indirect execution. In one example, access-control label 120 may indicate these privileges by way of one or more flags and/or bits. In this example, privilege module 106 may then associate access-control label 120 with underlying program 224 and/or any processes that are launched from underlying program 224.

In some examples, after being launched, parent process 122 may reference access-control label 120. For example, parent process 122 may maintain a pointer to access-control label 120. In one example, execution module 108 may spawn and/or spin off child process 124 from parent process 122. In this example, such spawning may involve multiple system calls. For example, parent process 122 may issue a "fork( )" system call that initiates the launch of child process 124. Parent process 122 and/or child process 124 may then issue an "exec( )" system call that causes child process 124 to lose its reference to access-control label 120. As a result, parent process 122 and child process 124 may differ in that parent process 122 still references access-control label 120 but child process 124 does not.

In some examples, verification module 104 may identify child process 124 during and/or after the spawning sequence. In one example, verification module 104 may identify child process 124 based at least in part on the "fork( )" system call and/or the "exec( )" system call. For example, verification module 104 may determine that parent process 122 has spawned child process 124 upon receiving the "fork( )" system call and/or the "exec( )" system call in connection with the spawning sequence.

As illustrated in FIG. 3, at step 320 one or more of the systems described herein may receive, from the child process, a request to execute an unsigned script on the computing device. For example, verification module 104 may, as part of network device 206 in FIG. 2, receive a request from child process 124. In this example, the request may be configured and/or programmed to initiate the execution of unsigned script 126 on network device 206.

The systems described herein may perform step 320 in a variety of ways and/or contexts. In some examples, verification module 104 may receive the request and then check whether the request is directed to executing a signed script or an unsigned script. For example, verification module 104 may search for a digital signature of script 126. During this search, verification module 104 may determine that script 126 has no such digital signature. As a result, verification module 104 may conclude that script 126 is unsigned.

In some examples, verification module 104 may detect the request to execute unsigned script 126 in connection with a script interpreter 222. For example, child process 124 may need to invoke and/or run script interpreter 222 to facilitate executing unsigned script 126. In this example, script interpreter 222 may include and/or represent a PYTHON interpreter and/or a RUBY interpreter that reads and/or interprets instructions on network device 206.

In some examples, script interpreter 222 may be limited to only indirect execution. For example, script interpreter 222 may be flagged by MAC framework 240 for only indirect execution as a security measure and/or feature. In this example, script interpreter 222 may include metadata that dictates certain attributes and/or designations. As a specific example, script interpreter 222 in FIG. 4 may include and/or contain certain flags. In this example, one of those flags may restrict and/or limit script interpreter 222 to only indirect execution.

In one example, the term "indirect execution" may refer to the execution of a script interpreter as instantiated by way of a script that calls the script interpreter. As an example, a script may include and/or contain a line of code (e.g., "#!/bin/the-interpreter") that invokes child process 124. In the event that the script is called on network device 206, the operating system of network device 206 may read that line of code and then start executing child process 124 with the script as an argument in response to that line of code. Accordingly, child process 124 may be invoked indirectly and/or as a side effect of the script having been called.

In one example, the term "direct execution" may refer to the execution of a script interpreter as instantiated by way of a direct call from a process, as opposed to a script. For example, child process 124 may issue a call and/or request to directly execute child process 124 on network device 206. In this example, the direct call and/or request may include an instruction and/or command (e.g., "/bin/the-interpreter the-script") that directs the operating system of network device 206 to start executing child process 124 with the script as an argument.

In some examples, verification module 104 may detect an attempt by child process 124 to directly execute script interpreter 222. For example, verification module 104 may receive the call and/or request to directly execute child process 124 on network device 206. In one example, the request may arrive at MAC framework 240 to verify whether child process 124 is allowed to run on network device 206 under the given circumstances.

In certain embodiments, MAC framework 240 may include an assortment of MAC modules. For example, MAC framework 240 may include and/or contain verification module 104 and/or privilege module 106. As the request arrives at MAC framework 240, verification module 104 may detect and/or identify the request and then determine whether script interpreter 222 is allowed to be directly executed on network device 206. In other words, verification module 104 may determine whether child process 124 is allowed to invoke and/or execute script interpreter 222 directly.

In some examples, verification module 104 may check whether child process 124 has a flag that restricts child process 124 to only indirect execution from a script. In one example, upon performing this check, verification module 104 may determine that child process 124 does indeed have an indirect-execution flag. In response, verification module 104 may query privilege module 106 for any special privileges to override the indirect-execution flag.

To satisfy this query, privilege module 106 may check for any indication and/or evidence that the child process 124 has a privilege to override the indirect-execution flag of script interpreter 222. For example, privilege module 106 may search for an access-control label that is referenced by child process 124. Upon performing this search, privilege module 106 may determine that child process 124 does not currently reference any access-control labels. As a result, privilege module 106 may check access-control label 120 referenced by parent process 122 because child process 124 spawned from parent process 122. During this check, privilege module 106 may determine that access-control label 120 indicates that parent process 122 has a privilege to override the indirect-execution flag of script interpreter 222.

In one example, access-control label 120 may include and/or contain a flag and/or bit indicating that parent process 122 and/or underlying program 224 is privileged to invoke direct execution of restricted interpreters (e.g., script interpreter 222). Additionally or alternatively, access-control label 120 may include and/or contain a flag and/or bit indicating that restricted interpreters invoked by parent process 122 and/or underlying program 224 are allowed to execute and/or run unsigned scripts—at least on a temporary basis.

Upon determining that parent process 122 does have the privilege to override the indirect-execution flag of script interpreter 222, privilege module 106 may impute that privilege of parent process 122 to child process 124 via MAC framework 240 in connection with the attempt by child process 124 to directly execute script interpreter 222. In doing so, privilege module 106 may effectively override the indirect-execution flag of script interpreter 222. In one example, privilege module 106 may afford this privilege to child process 124 only during ZTP. In this example, privilege module 106 may revoke this privilege from child process 124 after the completion of ZTP.

In some examples, privilege module 106 may configure a process label 220 within child process 124 to indicate that child process 124 has the privilege to override the indirect-execution flag of script interpreter 222 and the privilege to override the restriction against executing unsigned scripts. For example, privilege module 106 may set one or more override flags within process label 220 of child process 124. In this example, one override flag may include and/or represent data (e.g., a bit) indicating that child process 124 is temporarily afforded the privilege to override the indirect-execution flag of script interpreter 222.

In some embodiments, this set override flag within process label 220 may indicate that script interpreter 222 has the privilege to override the indirect-execution flag once. Additionally or alternatively, this set override flag within process label 220 may indicate that child process 124 is able to import and/or execute one or more unsigned scripts, files, codes, and/or snippets via script interpreter 222.

In one example, the override flag may encompass and/or represent multiple conditions, privileges, and/or attributes of child process 124. For example, process label 220 may include one override flag indicating whether child process 124 has the privilege to override the indirect-execution flag of script interpreter 222 and another override flag indicating that script interpreter 222 is able to import and/or run one or more unsigned scripts, files, codes, and/or snippets in connection with child process 124. In this example, process label 220 may also include a global override flag indicating that (1) child process 124 has the privilege to override the indirect-execution flag of script interpreter 222 and (2) script interpreter 222 is able to import and/or run one or more unsigned scripts, files, codes, and/or snippets in connection with child process 124. Accordingly, this global override flag may be set when both of the other override flags are set within process label 220.

In one example, process label 220 may be included in and/or represent part of child process 124. In this example, process label 220 may be unique to, specific to, and/or limited to child process 124. Because process label 220 is uniquely applied to only child process 124, no other processes may be allowed to benefit from the override flag set within process label 220. Accordingly, process label 220 and access-control label 120 may represent different types and/or forms of labels. In one example, while process label 220 may be uniquely applicable to only child process 124, access-control label 120 may generally apply to all execution instances of underlying program 224. However, as occurred with child process 124, some of those execution instances may lose their references to access-control label 120 during the spawning sequence.

In some examples, access-control label 120 may be shared by parent process 122 and/or one or more additional processes. In this example, access-control label 120 may include and/or represent a text file stored external to parent process 122 and/or in connection with underlying program 224. In contrast, process label 220 may include and/or represent a portion of child process 124 itself.

In some examples, privilege module 106 may opt to check and/or search access-control label 120 for privileges in response to certain events. For example, privilege module 106 may first attempt to check and/or search an access-control label referenced by child process 124. However, in this example, child process 124 may have no reference and/or pointer to an access-control label. As a result, upon initiating that check and/or search, privilege module 106 may find, learn, determine, and/or discover that child process 124 does not have an access-control label. In response to the determination that the child process 124 lacks its own access-control label, privilege module 106 may turn to access-control label 120 referenced by parent process 122 to determine whether parent process 122 has such privileges.

In some examples, execution module 108 may execute script interpreter 222 in connection with child process 124 despite the indirect-execution flag. For example, because child process 124 obtained the privilege to override the indirect-only flag from access-control label 120, execution module 108 may implement and/or run script interpreter 222 to facilitate the attempt by child process 124 to execute unsigned script 126. In some examples, verification module 104 may confirm and/or ensure that process label 220 of child process 124 indicates that child process 124 has the privilege to override the restriction. Verification module 104 may do so by confirming and/or ensuring that the corresponding override flag within process label 220 is set. Verification module 104 may then direct execution module 108 to execute script interpreter 222 in connection with the child process 124.

As illustrated in FIG. 3, at step 330 one or more of the systems described herein may determine whether to override the restriction against executing unsigned scripts. For example, privilege module 106 may, as part of network device 206 in FIG. 2, determine whether to override the restriction against executing unsigned scripts. In some examples, the restriction against executing unsigned scripts may be overridden to accommodate, fulfill, and/or satisfy an exception. In one example, an exception to this restriction may be a one-time privilege, permission, and/or allowance to perform a single execution of unsigned script 126 during ZTP.

In some examples, this restriction may represent and/or constitute a security feature of network device 206. For example, MAC framework 240 may monitor actions performed by processes running on network device 206. In this example, MAC framework 240 may, as a general rule, restrict such processes from executing unsigned scripts. Without this restriction, network device 206 may be less secure and/or more susceptible or vulnerable to attack and/or intrusion.

The systems described herein may perform step 330 in a variety of ways and/or contexts. As illustrated in FIG. 3, at step 330(1) one or more of the systems described herein may check an access-control label referenced by the parent process. For example, privilege module 106 may, as part of network device 206 in FIG. 2, check access-control label 120 of parent process 122 for a privilege to override the restriction against executing unsigned scripts. In other words, privilege module 106 may check and/or search access-control label 120 for any indication and/or evidence that parent process 122 and/or underlying program 224 has the privilege to override the restriction against executing unsigned scripts. In one example, access-control label 120 may include and/or contain a flag and/or bit indicating that parent process 122 and/or underlying program 224 is privileged to execute unsigned scripts—at least on a temporary basis. Additionally or alternatively, access-control label 120 may include and/or contain a flag and/or bit indicating that unsigned scripts called by parent process 122 and/or underlying program 224 are privileged for execution.

As further illustrated in FIG. 3, at step 330(2) one or more of the systems described herein may determine that the access-control label referenced by the parent process indicates that the parent process has the privilege to override the restriction against executing unsigned scripts. For example, upon checking and/or searching access-control label 120, privilege module 106 may, as part of network device 206 in FIG. 2, determine that access-control label 120 indicates that parent process 122 and/or underlying program 224 have the privilege to override the restriction against executing unsigned scripts.

As illustrated in FIG. 3, at step 340 one or more of the systems described herein may impute, to the child process, the privilege of the parent process to override the restriction against executing unsigned scripts. For example, privilege module 106 may, as part of network device 206 in FIG. 2, impute the privilege of parent process 122 to override the restriction against executing unsigned scripts to child process 124. In one example, child process 124 may therefore inherit and/or regain this privilege after having lost it as a result of the "exec( )" system call during the spawning sequence.

The systems described herein may perform step 340 in a variety of ways and/or contexts. In some examples, privilege module 106 may extend and/or apply the privilege to execute unsigned scripts to child process 124 on a temporary basis and/or for a one-time use only. For example, privilege module 106 may afford this privilege to child process 124 only during ZTP. In this example, privilege module 106 may revoke this privilege from child process 124 after the completion of ZTP.

As illustrated in FIG. 3, at step 350 one or more of the systems described herein may execute the unsigned script despite the restriction due at least in part to the privilege of the parent process having been imputed to the child process. For example, execution module 108 may, as part of network device 206 in FIG. 2, execute unsigned script 126 despite the restriction. In this example, execution module 108 may be able to do so because the privilege to override the restriction against executing unsigned scripts was imputed from parent process 122 and/or underlying program 224 to child process 124 after the spawning sequence.

The systems described herein may perform step 350 in a variety of ways and/or contexts. In some examples, execution module 108 may execute unsigned script 126 by way of script interpreter 222 invoked by child process 124. In one example, execution module 108 may run unsigned script 126 via script interpreter 222 as a one-time exception to the restriction. Additionally or alternatively, execution module 108 may execute unsigned script 126 in response to the request issued by child process 124.

In some examples, execution module 108 may receive the request to execute unsigned script 126 from verification module 104. For example, after determining that access-control label 120 indicates that parent process 122 has the privilege to override the restriction, privilege module 106 may set the override flag within process label 220 of child process 124. In this example, verification module 104 may subsequently confirm and/or ensure that process label 220 of child process 124 indicates that child process 124 has the privilege to override the restriction. Verification module 104 may do so by confirming and/or ensuring that the corresponding override flag within process label 220 is set. Verification module 104 may then forward the request to execute unsigned script 126 to execution module 108. Additionally or alternatively, verification module 104 may direct execution module 108 to execute unsigned script 126 to satisfy and/or fulfill the request issued by child process 124.

In some examples, the privilege imputed to child process 124 may only be used to facilitate a one-time execution of unsigned script 126. In such examples, after the one-time execution of unsigned script 126, the restriction may prevent child process 124 from executing unsigned script 126 again—at least until unsigned script 126 is authenticated and/or signed. If script 126 is authenticated and/or signed after completion of ZTP, the restriction may no longer apply to script 126, and thus script 126 may be allowed to run on network device 206 without exception.

As a specific example, underlying program 224 may represent a DHCP client involved in ZTP on network device 206. In this example, script interpreter 222 may be privileged by access-control label 120 of parent process 122 to run via direct execution in connection with child process 124. While running via child process 124, script interpreter 222 may execute unsigned script 126 as network device 206 is provisioned via ZTP. In other words, as network device 206 performs and/or implements ZTP, script interpreter 222 may read unsigned script 126 for execution. In one embodiment, this ZTP may involve network device 206 downloading ZTP configuration 210 in FIG. 2 from computing device 202 and/or installing the same.

In some examples, unsigned script 126 may be generated dynamically on network device 206 and then run on the same. In one example, script 126 may be unsigned due at least in part to the incompletion of ZTP on network device 206. For example, network device 206 may lack the signing keys used to sign dynamically generated scripts because those keys are provisioned during ZTP. In this example, since ZTP is incomplete, those keys may be unavailable. As a result, script 126 may remain unsigned after being dynamically generated on network device 206. In one embodiment, unsigned script 126 may include and/or represent a shell script.

Figure 5:
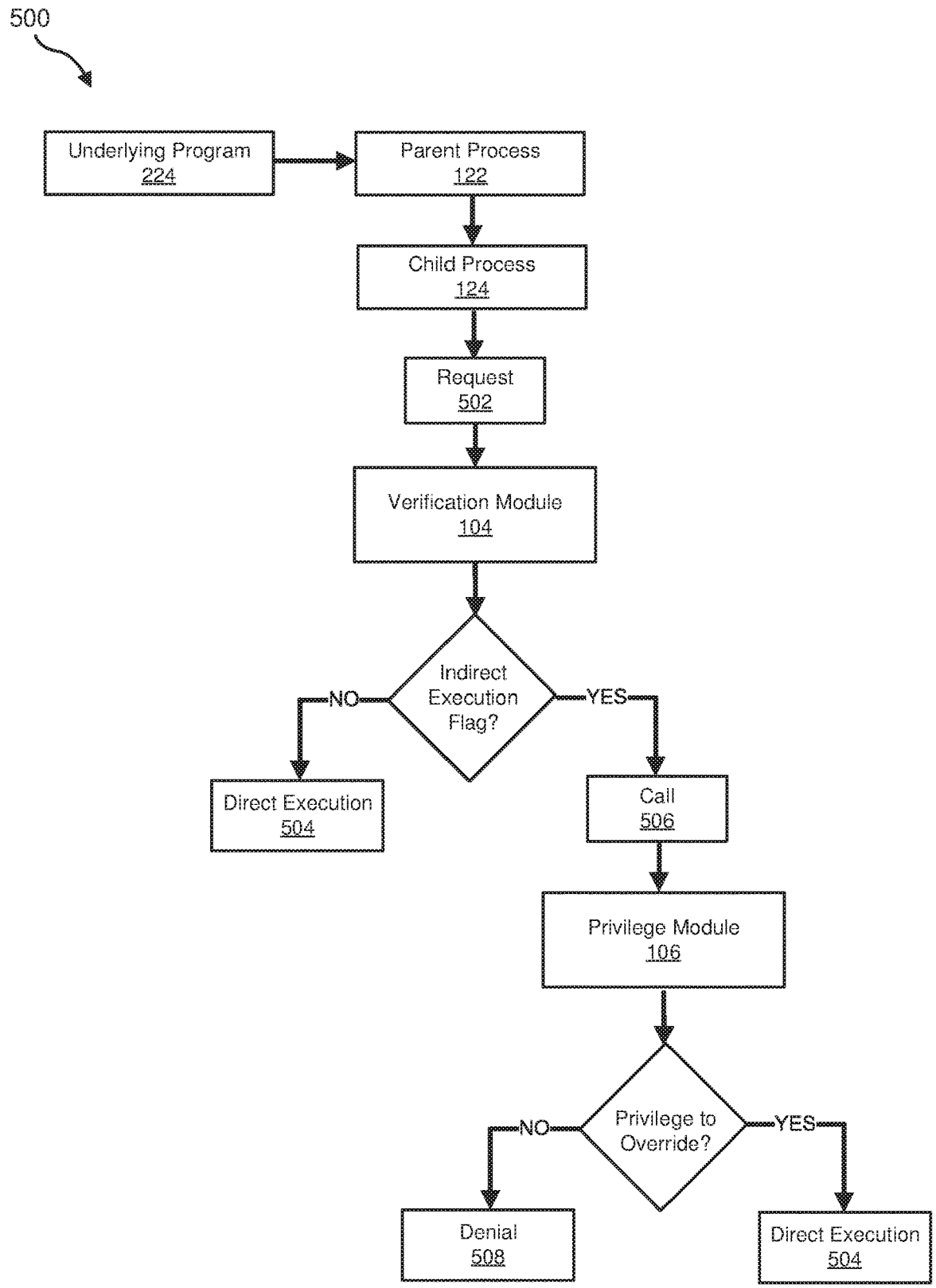
FIG. 5 is a flow diagram of an exemplary method for secure execution of unsigned scripts.

FIG. 5 is a flow diagram of an exemplary computer-implemented method 500 for secure execution of unsigned scripts. As illustrated in FIG. 5, parent process 122 may launch from underlying program 224 and then spawn child process 124. In one example, child process 124 may issue a request 502 to directly execute a PYTHON interpreter. In this example, request 502 may be directed by MAC framework 240 to verification module 104. Upon receiving request 502, verification module 104 may determine whether the PYTHON interpreter is allowed to run on network device 206 via direct execution by checking the indirect-execution flag of the PYTHON interpreter.

In one example, if the indirect-execution flag of the PYTHON interpreter is not set, verification module 104 may verify and/or confirm that the PYTHON interpreter is allowed to run via direct execution. As a result, verification module 104 may instruct network device 206 to directly execute the PYTHON interpreter. In response, network device 206 may perform a direct execution 504 of the PYTHON interpreter.

However, because direct execution of a PYTHON interpreter may pose a security risk to network device 206 and/or network 204, the indirect-execution flag of the interpreter may be set. In this case, verification module 104 may verify and/or confirm that the PYTHON interpreter is not normally allowed to run on network device 206 via direct execution. In response, verification module 104 may issue a call 506 to determine whether child process 124 has a privilege to override the indirect-execution flag of the PYTHON interpreter this one time. In one example, call 506 may be directed via MAC framework 240 to privilege module 106.

Upon receiving call 506, privilege module 106 may determine whether parent process 122, which spawned child process 124, has the privilege to override the indirect-execution flag of the PYTHON interpreter. In one example, privilege module 106 may make this determination by checking access-control label 120 of parent process 122 for any indication and/or evidence that parent process 122 has the privilege to override the indirect-execution flag of the PYTHON interpreter.

In one example, if parent process 122 does not have such a privilege, privilege module 106 may configure a process label of child process 124 to indicate the same and/or notify verification module 104 of the same. In response, verification module 104 may issue a denial 508 of request 502 to run the PYTHON interpreter by direct execution. However, if parent process 122 does have such a privilege, privilege module 106 may impute and/or temporarily afford this privilege to child process 124 for a single use and/or configure process label 220 of child process 124 to indicate the same. As a result, verification module 104 may instruct network device 206 to execute the PYTHON interpreter as requested by child process 124. In response, network device 206 may perform direct execution 504 of the PYTHON interpreter this one time.

Figure 6:
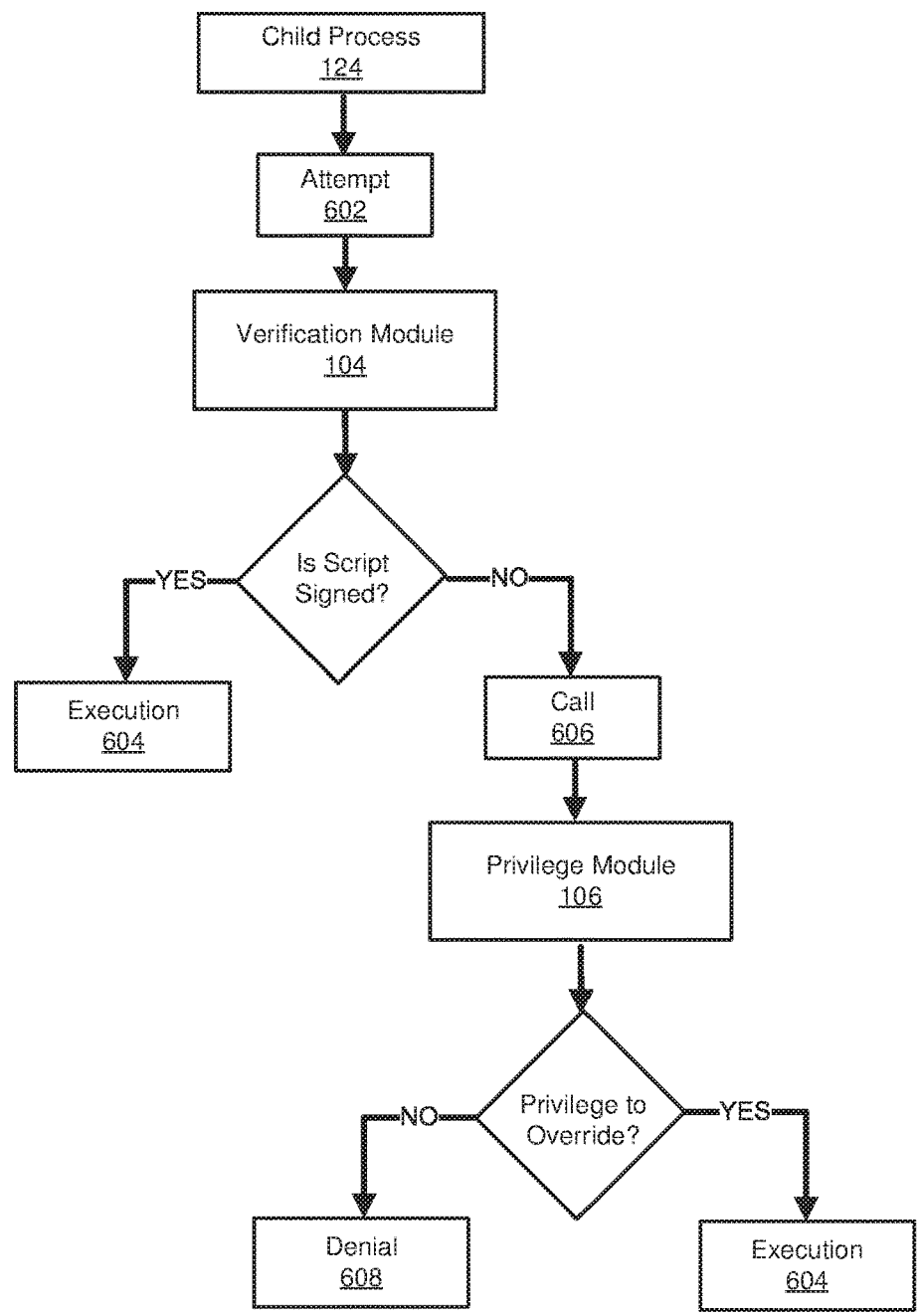
FIG. 6 is a flow diagram of an exemplary method for secure execution of unsigned scripts.

FIG. 6 is a flow diagram of an exemplary computer-implemented method 600 for secure execution of unsigned scripts. As illustrated in FIG. 6, after implementing the PYTHON interpreter, child process 124 may perform an attempt 602 to execute a script via the PYTHON interpreter. Upon detecting attempt 602, verification module 104 may determine whether child process 124 is allowed to execute the script via the PYTHON interpreter by checking for a digital signature of the script.

In one example, if the script is signed, verification module 104 may verify and/or confirm that child process 124 is allowed to run the signed script as read by the PYTHON interpreter. As a result, verification module 104 may instruct network device 206 to run the signed script as read by the PYTHON interpreter. In response, network device 206 may perform an execution 604 of the signed script.

However, if the script is not signed, verification module 104 may verify and/or confirm that child process 124 is not normally allowed to run the unsigned script as read by the PYTHON interpreter. In response, verification module 104 may issue a call 606 to determine whether child process 124 has a privilege to override the restriction against executing unsigned scripts this one time. In one example, call 606 may be directed via MAC framework 240 to privilege module 106.

Upon receiving call 606, privilege module 106 may determine whether parent process 122, which spawned child process 124, has the privilege to override the restriction against executing unsigned scripts. In one example, privilege module 106 may make this determination by checking access-control label 120 of parent process 122 for any indication and/or evidence that parent process 122 has the privilege to override the restriction against executing unsigned scripts.

In one example, if parent process 122 does not have such a privilege, privilege module 106 may notify verification module 104 of the same. In response, verification module 104 may issue a denial 608 of attempt 602 to execute the unsigned script. However, if parent process 122 does have such a privilege, privilege module 106 may impute and/or temporarily afford this privilege to child process 124 for a single use and/or configure process label 220 of child process 124 to indicate the same. As a result, verification module 104 may instruct network device 206 to execute the unsigned script as read by the PYTHON interpreter and requested by child process 124. In response, network device 206 may perform execution 604 of the unsigned script.

In some examples, network device 206 may finish booting and/or reboot to complete ZTP. During this booting and/or rebooting process, one or more of modules 102 may clear the override flag to prevent child process 124 from running the PYTHON interpreter on network device 206 again via direct execution. Additionally or alternatively, one or more of modules 102 may clear the override flag to prevent child process 124 from executing an unsigned script as read by the PYTHON interpreter on network device 206 again unless and/or until the script is signed. For example, network device 206 may be able to authenticate and/or sign dynamically generated scripts after the completion of ZTP.

As explained above in connection with FIGS. 1-6, a network device may securely execute an unsigned script prior to the completion of ZTP. For example, the network device may include and/or implement a MAC framework that controls the ability of certain processes to implement a PYTHON interpreter and/or execute scripts. In one example, this MAC framework may include and/or represent a "mac_veriexec" module, a "mac_grantbylabel" module, and a "mac_priv_grant" module. The "mac_priv_grant" module may include and/or represent an Application Programming Interface (API).

In this example, a parent process may spawn a child process in an attempt to execute an unsigned script as the network device is powered up for the first time at a data center. Because this is the first time that the network device is powered up, the network device may have yet to undergo and/or complete ZTP. As part of this attempt to execute the unsigned script, the child process may issue a request to directly execute the PYTHON interpreter to the MAC framework. As this request arrives at the MAC framework, the "mac_veriexec" module may attempt to verify whether the PYTHON interpreter is normally allowed to run on the network device via direct execution. To do so, the "mac_veriexec" module may check whether the PYTHON interpreter is flagged for indirect execution only.

Upon performing this check, the "mac_veriexec" module may determine that the PYTHON interpreter is flagged for indirect execution on the network device. In response to this determination, the "mac_veriexec" module may query the "mac_priv_grant" module to check whether the parent process has any privileges that would enable the "mac_priv_grant" module to override the PYTHON interpreter's indirect-execution flag. To do so, the "mac_priv_grant" module may call on the "mac_grantbylabel" module to analyze the MAC label of the parent process that spawned the child process attempting to invoke the PYTHON interpreter. During this analysis, the "mac_grantbylabel" module may search for any indication and/or evidence that the parent process has the privilege to override the indirect-execution flag of the PYTHON interpreter.

If the parent process has such a privilege, the "mac_grantbylabel" module may notify the "mac_priv_grant" module of the same. In response to this notification, the "mac_priv_grant" module may impute and/or afford this privilege of the parent process to the child process this one time. For example, the "mac_priv_grant" module and/or the "mac_grantbylabel" module may set a "PRIV_VERIEXEC_DIRECT" flag and/or a "PRIV_V-

ERIEXEC_NOVERIFY" flag within a process label of the child process. Additionally or alternatively, the "mac_priv_grant" module and/or the "mac_grantbylabel" module may set a "GBL_VERIEXEC" flag that encompasses and/or represents a combination of the "PRIV_V-ERIEXEC_DIRECT" flag and/or the "PRIV_VERIEXEC_NOVERIFY" flag within the process label of the child process.

In one embodiment, the "PRIV_VERIEXEC_DIRECT" flag within the process label may indicate whether the child process has the privilege to run the PYTHON interpreter via direct execution. Additionally or alternatively, the "PRIV_VERIEXEC_NOVERIFY" flag within the process label may indicate whether the child process has the privilege to override the restriction against executing unsigned scripts read by the PYTHON interpreter.

After setting such flags, the "mac_priv_grant" module may notify the "mac_veriexec" module of the same and/or return the flow of execution to the "mac_veriexec" module. At this point, the "mac_veriexec" module may check the process label of the child process to determine whether the indirect-execution flag has been overridden. Upon doing so, the "mac_veriexec" module may determine that the child process is now allowed to run the PYTHON interpreter via direct execution. While running via the child process on the network device, the PYTHON interpreter may import, invoke, and/or execute one or more unsigned scripts, files, codes, and/or snippets, thereby potentially improving the efficiency and/or productivity of the network device prior to being fully provisioned via ZTP and without compromising the network device's security.

As another example, the child process may attempt to execute an unsigned script. In this example, the "mac_veriexec" module may detect that the script is not signed. Normally, the "mac_veriexec" module may return an error in response to detecting such a request. However, instead of returning an error, the "mac_veriexec" module may call the "mac_priv_grant" module with a "PRIV_VERIEXEC_NOENTRY" argument. In one example, the "PRIV_VERIEXEC_NOENTRY" flag may be handled and/or treated in the same way as the "PRIV_VERIEXEC_DIRECT" flag. Accordingly, if the MAC label of the parent process indicates that the parent process has the privilege to override the indirect-execution flag and the restriction against executing unsigned scripts, the "mac_priv_grant" module and/or the "mac_grantbylabel" module may set the "GBL_VERIEXEC" flag within the process label of the child process.

Figure 7:
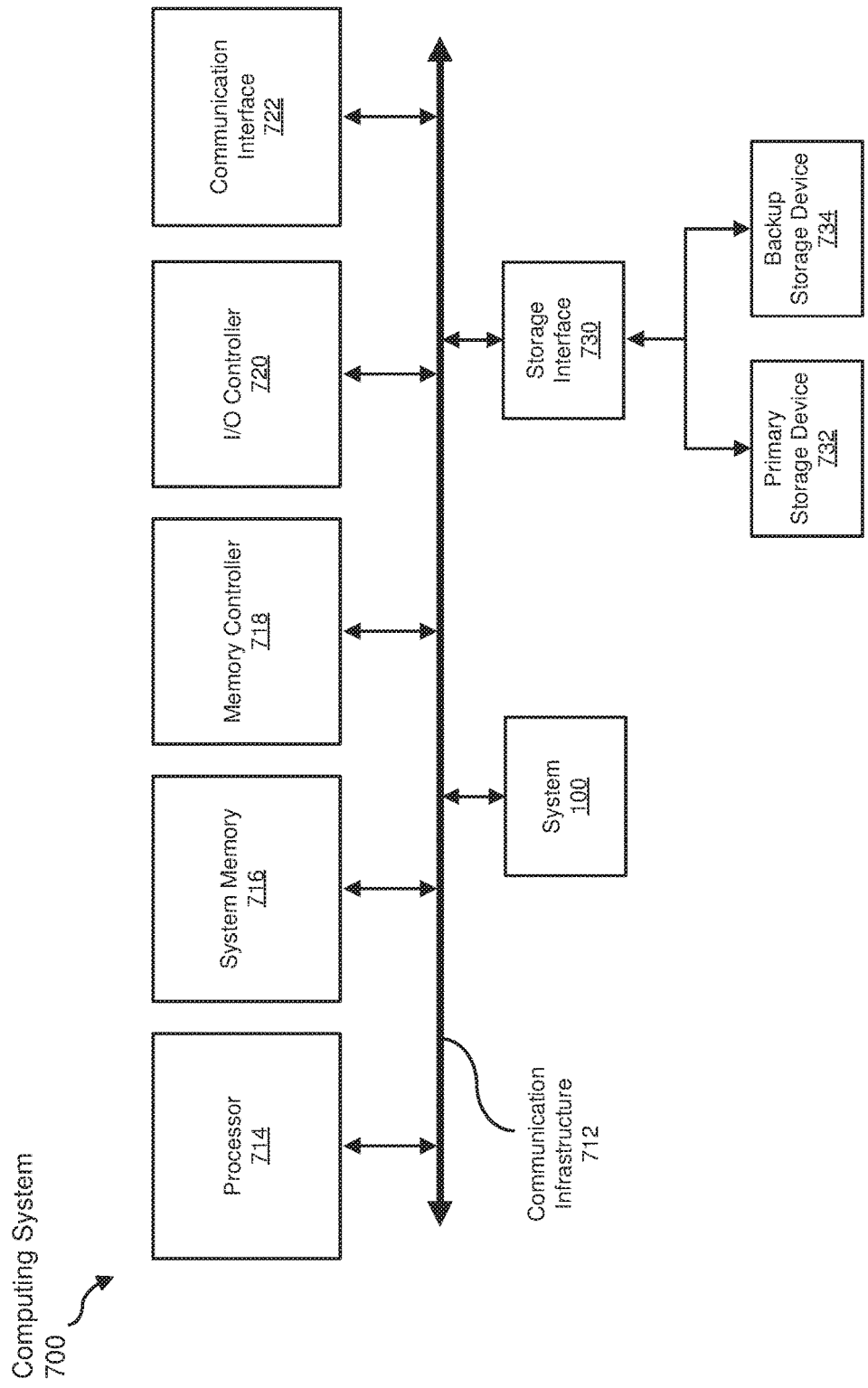
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   identifying a child process that spawned from a parent process running on a computing device;
   associating an access-control label referenced by the parent process with an underlying program that launched the parent process on the computing device;
   configuring the access-control label to indicate that the underlying program has:
      a privilege to override a restriction against executing unsigned scripts; and
      a privilege to override a flag for only indirect execution;
   detecting an attempt by the child process to directly execute a script interpreter that has been flagged for only indirect execution on the computing device by receiving, from the child process, a direct call to execute an unsigned script via the script interpreter on the computing device;
   in response to detecting the attempt by the child process to directly execute the script interpreter, determining whether to override the restriction against executing unsigned scripts via the script interpreter even though the script interpreter has been flagged for only indirect execution by:
      checking the access-control label referenced by the parent process; and
      determining that the access-control label referenced by the parent process indicates that the parent process has the privilege to override the restriction against executing unsigned scripts via the script interpreter even though the script interpreter has been flagged for only indirect execution;
   imputing, to the child process, the privilege of the parent process to override the restriction against executing unsigned scripts via the script interpreter; and
   executing, on the computing device, the unsigned script via the script interpreter despite the restriction due at least in part to the privilege of the parent process to override the restriction having been imputed to the child process.

2. The method of claim 1, further comprising:
   launching the parent process as an instance of the underlying program that references the access-control label; and
   spawning, from the parent process, the child process as an additional instance of the underlying program that does not reference the access-control label.

3. The method of claim 2, further comprising determining that the child process does not reference the access-control label associated with the underlying program; and
   wherein checking the access-control label referenced by the parent process comprises checking the access-control label referenced by the parent process due at least in part to the child process not referencing the access-control label associated with the underlying program.

4. The method of claim 1, further comprising configuring, within the child process, a process label to indicate that the child process has:
   the privilege to override the restriction against executing unsigned scripts; and
   the privilege to override the flag for only indirect execution.

5. The method of claim 4, wherein the process label:
   is unique to the child process; and
   does not apply to the parent process or the underlying program.

6. The method of claim 4, further comprising, prior to executing the script interpreter, ensuring that the process label within the child process indicates that the child process has the privilege to override the flag for only indirect execution; and
   wherein executing the script interpreter comprises executing the script interpreter upon ensuring that the process label within the child process indicates that the child process has the privilege to override the flag for only indirect execution.

7. The method of claim 1, wherein the access-control label applies to the parent process and the underlying program.

8. The method of claim 1, wherein the underlying program comprises at least one of:
   a Dynamic Host Configuration Protocol (DHCP) client;
   a management daemon; and
   an event daemon.

9. The method of claim 1, wherein the underlying program is involved in a Zero-Touch Provisioning (ZTP) performed on the computing device.

10. A system comprising:
a verification module, stored in memory, that:
   identifies a child process that spawned from a parent process running on a computing device; and
   detects an attempt by the child process to directly execute a script interpreter that has been flagged for only indirect execution on the computing device by receiving, from the child process, a direct call to execute an unsigned script via the script interpreter on the computing device;
a privilege module, stored in memory, that:
   associates an access-control label referenced by the parent process with an underlying program that launched the parent process on the computing device;
   configures the access-control label to indicate that the underlying program has:
      a privilege to override a restriction against executing unsigned scripts; and
      a privilege to override a flag for only indirect execution;
   determines, in response to the attempt by the child process to directly execute the script interpreter, whether to override the restriction against executing unsigned scripts via the script interpreter even though the script interpreter has been flagged for only indirect execution by:
      checking the access-control label referenced by the parent process; and
      determining that the access-control label referenced by the parent process indicates that the parent process has the privilege to override the restriction against executing unsigned scripts via the script interpreter even though the script interpreter has been flagged for only indirect execution; and
   imputes, to the child process, the privilege of the parent process to override the restriction against executing unsigned scripts via the script interpreter; and
an execution module, stored in memory, that executes the unsigned script via the script interpreter on the computing device despite the restriction due at least in part to the privilege of the parent process to override the restriction having been imputed to the child process; and
at least one physical processing device that implements the verification module, the privilege module, and the execution module.

11. The system of claim 10, wherein the execution module:
   launches the parent process as an instance of the underlying program that references the access-control label; and
   spawns, from the parent process, the child process as an additional instance of the underlying program that does not reference the access-control label.

12. The system of claim 11, wherein the privilege module:
   determines that the child process does not reference the access-control label associated with the underlying program; and
   checks the access-control label referenced by the parent process due at least in part to the child process not referencing the access-control label associated with the underlying program.

13. The system of claim 10, wherein the privilege module configures, within the child process, a process label to indicate that the child process has:
   the privilege to override the restriction against executing unsigned scripts; and
   the privilege to override the flag for only indirect execution.

14. An apparatus comprising:
at least one storage device that stores an underlying program capable of running on a computing device; and
a physical processing device communicatively coupled to the storage device, wherein the physical processing device:
   identifies a child process that spawned from a parent process running on the computing device;
   associates an access-control label referenced by the parent process with the underlying program that launched the parent process on the computing device;
   configures the access-control label to indicate that the underlying program has:
      a privilege to override a restriction against executing unsigned scripts; and
      a privilege to override a flag for only indirect execution;
   detects an attempt by the child process to directly execute a script interpreter that has been flagged for only indirect execution on the computing device by receiving from the child process, a direct call to execute an unsigned script on the computing device;
   determines, in response to detecting the attempt by the child process to directly execute the script interpreter, whether to override the restriction against executing unsigned scripts via the script interpreter even though the script interpreter has been flagged for only indirect execution by:
      checking the access-control label referenced by the parent process; and
      determining that the access-control label referenced by the parent process indicates that the parent process has the privilege to override the restriction against executing unsigned scripts via the script interpreter even though the script interpreter has been flagged for only indirect execution;
   imputes, to the child process, the privilege of the parent process to override the restriction against executing unsigned scripts via the script interpreter; and
   executes, on the computing device, the unsigned script via the script interpreter despite the restriction due at least in part to the privilege of the parent process to override the restriction having been imputed to the child process.

* * * * *